(12) United States Patent
Löwstedt et al.

(10) Patent No.: US 12,415,152 B2
(45) Date of Patent: *Sep. 16, 2025

(54) TUBULAR AIR FILTER ELEMENT

(71) Applicant: VOLVO TRUCK CORPORATION, Gothenburg (SE)

(72) Inventors: Carl Löwstedt, Onsala (SE); Fredrik Rahm, Hörby (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 58 days.

This patent is subject to a terminal disclaimer.

(21) Appl. No.: 18/158,726

(22) Filed: Jan. 24, 2023

(65) Prior Publication Data

US 2023/0241539 A1    Aug. 3, 2023

(30) Foreign Application Priority Data

Jan. 28, 2022   (EP) .................................... 22153800

(51) Int. Cl.
| | | |
|---|---|---|
| *B01D 46/24* | (2006.01) | |
| *B01D 46/00* | (2022.01) | |
| *B01D 46/66* | (2022.01) | |
| *B01D 46/88* | (2022.01) | |
| *B60L 50/72* | (2019.01) | |
| *H01M 8/0662* | (2016.01) | |

(52) U.S. Cl.
CPC ..... *B01D 46/2414* (2013.01); *B01D 46/0004* (2013.01); *B01D 46/2411* (2013.01); *B01D 46/66* (2022.01); *B01D 46/88* (2022.01); *B60L 50/72* (2019.02); *H01M 8/0687* (2013.01); *B01D 2271/027* (2013.01); *H01M 2250/20* (2013.01)

(58) Field of Classification Search
None
See application file for complete search history.

(56) References Cited

U.S. PATENT DOCUMENTS

| | | | | |
|---|---|---|---|---|
| 6,099,729 A | * | 8/2000 | Cella | B01D 29/58 |
| | | | | 210/493.2 |
| 6,355,077 B1 | | 3/2002 | Chittenden et al. | |
| 6,766,782 B1 | * | 7/2004 | Martin | F02M 35/024 |
| | | | | 55/DIG. 28 |

(Continued)

FOREIGN PATENT DOCUMENTS

| | | | |
|---|---|---|---|
| CN | 209662822 U | * | 11/2019 |
| CN | 113491915 A | | 10/2021 |

(Continued)

OTHER PUBLICATIONS

CN209662822U_ENG (Espacenet machine translation of Tong) (Year: 2019).*

(Continued)

*Primary Examiner* — Gabriel E Gitman
(74) *Attorney, Agent, or Firm* — Venable LLP; Jeffri A. Kaminski

(57) ABSTRACT

A tube shaped air filter element for a fuel cell vehicle. The air filter element comprises a pair of circumferentially extending ridges on a first inner circumferential envelope surface, each of the pair of ridges protrudes towards a geometric centre axis of the air filter element and is configured to engage with an axially protruding portion of a filter housing.

11 Claims, 8 Drawing Sheets

(56) References Cited

U.S. PATENT DOCUMENTS

| | | |
|---|---|---|
| 2002/0036165 A1 | 3/2002 | Sommer et al. |
| 2008/0276583 A1 | 11/2008 | Munkel |
| 2014/0223868 A1* | 8/2014 | Kaufmann .......... B01D 46/523 55/357 |
| 2015/0343363 A1 | 12/2015 | Schlichter et al. |
| 2021/0254584 A1 | 8/2021 | Lejestrand et al. |

FOREIGN PATENT DOCUMENTS

| | | | |
|---|---|---|---|
| DE | 19521898 A1 * | 12/1996 | ......... B01D 46/2411 |
| DE | 10133893 A1 * | 1/2003 | ............. B01D 27/06 |
| DE | 102015210031 A1 | 5/2016 | |
| DE | 102018213332 A1 | 2/2020 | |
| IT | AN20110165 A1 | 6/2013 | |
| JP | 2014168733 A * | 9/2014 | |

OTHER PUBLICATIONS

DE10133893A1_ENG (Espacenet machine translation of Schneider) (Year: 2003).*

DE19521898A1_ENG (Espacenet machine translation of Mueller) (Year: 1996).*

JP2014168733A_ENG (Espacenet machine translation of Mishima) (Year: 2014).*

European Communication pursuant to Article 94(3) EPC dated Jul. 10, 2024 in corresponding European Patent Application No. 22153800. 2, 4 pages.

European Communication pursuant to Article 94(3) EPC dated Mar. 25, 2024 in corresponding European Patent Application No. 22153800. 2, 5 pages.

International Search Report and Written Opinion dated Apr. 3, 2023 in corresponding International PCT Application No. PCT/EP2023051735, 25 pages.

Partial European Search Report in corresponding European Application No. 22153800.2 dated May 11, 2022 (12 pages).

Extended European Search Report in corresponding European Application No. 22153800.2 dated Aug. 11, 2022 (10 pages).

* cited by examiner

TUBULAR AIR FILTER ELEMENT

TECHNICAL FIELD

The present invention relates to a tube shaped air filter element for a fuel cell vehicle. The invention also relates to an air filter system comprising such a tube shaped air filter element. Although the invention will mainly be directed to a vehicle in the form of a truck, the invention may also be applicable for other types of vehicles using a fuel cell for generating electric power to an electric traction motor, such as e.g., buses, working machines, and other transportation vehicles, etc.

BACKGROUND

There is a desire to be able to propel vehicles by using electric traction motors. Electric traction motors are more environmentally friendly compared to a conventional internal combustion engine. The electric power required to operate the electric traction motor is often received from an energy storage system.

For an electric traction motor, fuel cell systems, which are configured to generate the electric power to the electric traction motor, are developed. The fuel cell system comprises a fuel cell provided with a first side arranged to receive hydrogen, and a second side arranged to receive oxygen. By means of the hydrogen and oxygen, electric power is generated in the fuel cell.

However, and compared to an internal combustion engine, the fuel cell is more sensitive to debris in the air entering the second side. In detail, the functional operation of the fuel cell tends to be reduced if the air entering the fuel cell contains dust, particles, harmful gas, etc.

There is thus a desire to provide an improved air filter element and an air filter system for further reducing the risk of debris entering the fuel cell, both during operation as well as when changing air filter element during maintenance.

SUMMARY

It is thus an object of the present invention to at least partially overcome the above described deficiencies.

According to a first aspect, there is provided a tube shaped air filter element for a fuel cell vehicle, the air filter element being axially insertable into an opening at an axial end of an elongated filter housing, wherein the air filter element comprises a first axial end and a second axial end, the first axial end being arranged on an opposite axial end of the air filter element compared to the second axial end, wherein the second axial end is arranged to, when the air filter element is inserted into the filter housing, face the opening of the elongated filter housing, an outer circumferential envelope surface configured to face an axially extending inner surface of the filter housing, the outer circumferential envelope surface extending between the first and second axial ends, and a first inner circumferential envelope surface arranged at the first axial end of the air filter element, and a second inner circumferential envelope surface arranged at the second end of the air filter element, wherein the air filter element further comprises a pair of circumferentially extending ridges on the first inner circumferential envelope surface, each of the pair of ridges protrudes towards a geometric centre axis of the air filter element and is configured to engage with an axially protruding portion of the filter housing.

The ridges should be construed as bulges or protrusions which protrudes radially towards the geometric centre axis of the air filter element. Preferably, each of the pair of ridges are arranged at a distance from the axial end sides of the first inner circumferential envelope surface. In detail, the first inner circumferential envelope surface preferably comprises a first axial end side at the first axial end of the air filter element, and a second axial end side arranged at an axial distance from the first axial end side in a direction towards the second axial end, wherein each one of the pair of ridges are arranged at a non-zero distance from both the first axial end side as well as from the second axial end side.

The present invention is based on the insight that the pair of ridges will improve the interface between the air filter element and the filter housing. In detail, the pair of ridges simplifies the attachment of the air filter element to the filter housing when inserting the air filter element axially into the filter housing, since the pair of ridges will guide the air filter element along the axially protruding portion of the filter housing. The radial precision of connecting the air filter element to the filter housing is thus improved since the pair of ridges will be arranged in abutment with the axially protruding portion. The pair of ridges will also improve the sealing properties between the air filter element and the filter housing, thereby minimizing the risk of dust particles bypassing the air filter element into the air inlet of the fuel cell during operation. The improved sealing properties also have the additional advantage that other sealing elements of the air filter element and/or the filter housing can be reduced in size or even omitted. This may be particularly relevant for an axial sealing element provided axially between an axial end portion of the axially protruding portion and the air filter element.

Furthermore, and when inserting the air filter element into the housing, the pair of ridges also provides the advantage of pushing dust particles, present on the surface of the axially protruding portion of the filter housing engaging with the air filter element, away from the interface between the axially protruding portion and the air filter element. There is thus a reduced risk of dust entering the air inlet of the fuel cell during filter replacement.

According to an example embodiment, the pair of ridges may be axially parallel with each other. Furthermore, and according to an example embodiment, each of the pair of ridges may extend circumferentially around the entire first inner circumferential envelope surface. Hereby, the air filter element enables for an even further improved interface to the filter housing, in particular in terms of radial alignment and sealing properties to the filter housing. An advantage of arranging the pair of ridges in parallel is that the pair of ridges can sustain the lever arm forces generated by the air filter element when it is attached to the protruding portion.

According to an example embodiment, the pair of ridges and the first inner circumferential envelope surface may be formed by the same material. Preferably, and according to an example embodiment, the pair of ridges may be integrally formed with the first inner circumferential envelope surface. Integrally formed pair of ridges advantageously reduces the material consumption when producing such an air filter element. Also, there is no need of separately attaching the pair of ridges to the air filter element before connecting the air filter element into the filter housing.

According to an example embodiment, the pair of ridges may be separately attached to the first inner circumferential envelope surface. Preferably, but not exclusively, the pair of ridges and the first inner circumferential envelope surface are formed by different materials. This may be advantageous for specific applications where a certain sealing material is preferable. The separately attached pair of ridges may e.g. be formed by a pair of O-rings, etc.

According to an example embodiment, each of the pair of ridges may be attached in a respective circumferentially arranged groove formed in the first inner circumferential envelope surface. Hereby, a well defined position on the first inner circumferential envelope surface is provided.

According to a second aspect, there is provided an air filter system for a fuel cell vehicle, the air filter system comprising an elongated filter housing, and a tubular air filter element according to any one of the embodiments described above in relation to the first aspect, wherein the air filter element is housed inside the filter housing.

According to an example embodiment, the filter housing may comprise an opening at a first axial housing end, and an outlet connectable to a fuel cell at a second axial housing end, the air filter element being insertable into the filter housing through the first axial housing end.

According to an example embodiment, the filter housing may comprise an axially protruding portion at the second axial housing end, the axially protruding portion protrudes axially towards the first axial housing end.

According to an example embodiment, the pair of circumferentially extending ridges of the air filter element may engage with the axially protruding portion of the filter housing.

According to an example embodiment, the air filter system may further comprise a lid connectable to the second axial housing end upon removal of the air filter element from the filter housing. According to an example embodiment, the lid may be attachable to the axially protruding portion. The lid is advantageously attached to the axially protruding portion of the filter housing after removal of the air filter element during filter change. By attaching the lid, a reduced risk of dust particles entering the air inlet of the fuel cell is provided. Also, before inserting a new air filter element into the filter housing, the filter housing can be cleaned from dust and debris by, for example, blowing air into the interior of the filter housing or wiping the interior of the filter housing with a towel with the lid attached to the axially protruding portion.

According to an example embodiment, the lid may comprise a pair of circumferentially extending bulges protruding towards a geometric centre axis of the air filter system and is configured to engage with the axially protruding portion of the filter housing. The pair of bulges are preferably arranged in a similar manner as the above described pair of ridges. Any dust particles present on an envelope surface of the axially protruding portion of the filter housing will be pushed by the pair of bulges and subsequently forced out from the filter housing when cleaning the filter housing.

Further effects and features of the second aspect are largely analogous to those described above in relation to the first aspect.

According to a third aspect, there is provided a method of cleaning an air filter system for a fuel cell vehicle, the air filter system comprising a filter housing, an air filter element housed inside the filter housing, and a lid, wherein the filter housing comprises an opening at a first axial housing end of the filter housing, and an outlet connected to a fuel cell at a second axial housing end of the filter housing, the method comprising the steps of removing the air filter element from the filter housing by displacing the air filter element axially through the opening of the filter housing, inserting the lid through the opening of the filter housing and attach the lid on the outlet at the second axial housing end, and cleaning the filter housing from the opening of the filter housing.

The filter housing may, for example, be cleaned by blowing air into the empty filter housing through the opening of the filter housing. As an alternative, the filter housing may be cleaned by using a wet or dry towel or the like. The towel is thus used for cleaning the filter housing from the opening of the filter housing. It should thus be readily understood that it is the interior of the filter housing that is cleaned from e.g. dust and particles.

The method of the third aspect provides for a cleaning process with a reduced risk of particles entering the air inlet of the fuel cell.

Effects and features of the third aspect are largely analogous to those described above in relation to the first and second aspects.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
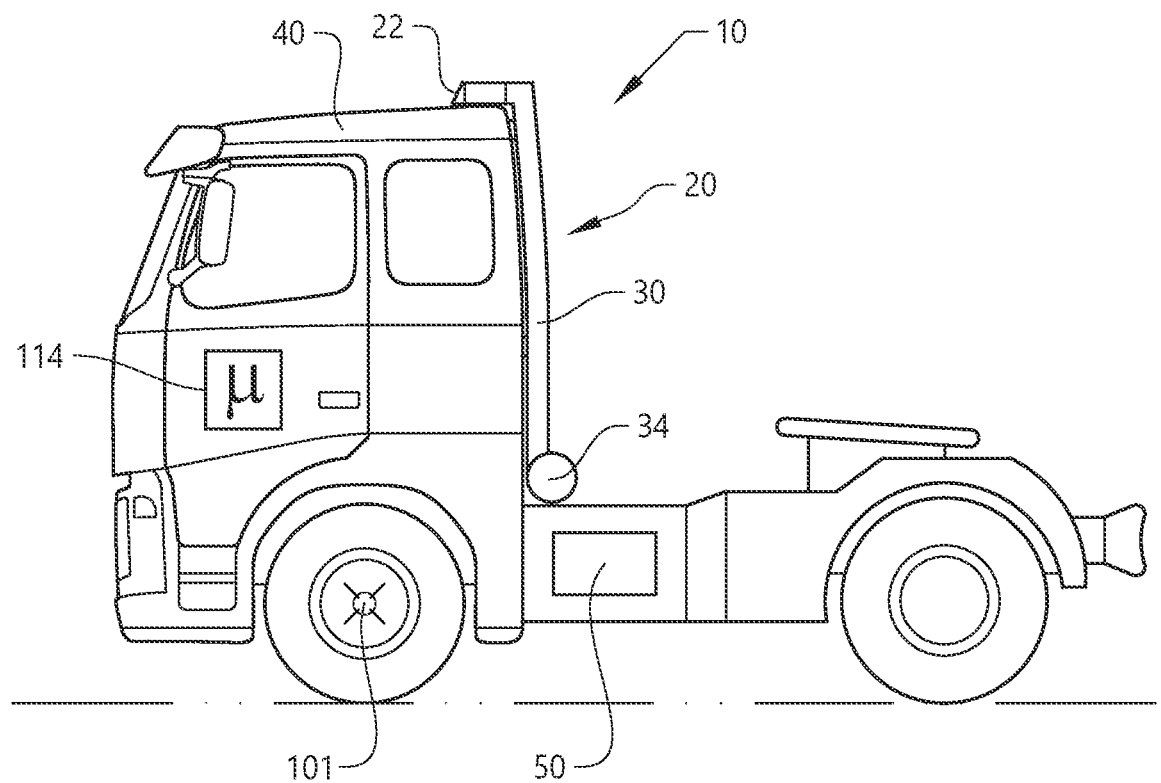
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 10 in the form of a truck. The vehicle comprises a traction motor 101 for propelling the wheels of the vehicle. The traction motor 101 is in the example embodiment an electric machine arranged to receive electric power from a battery or directly from a fuel cell system which is described in further detail below. The vehicle 10 also comprises a control unit 114 for controlling various operations as will also be described in further detail below, and a fuel cell system 50 arranged to generate electric power for supply to a battery or for directly supply to the electric traction motors 101.

The control unit 114 may include a microprocessor, microcontroller, programmable digital signal processor or another programmable device. The control unit 114 may also, or instead, include an application specific integrated circuit, a programmable gate array or programmable array logic, a programmable logic device, or a digital signal processor. Where the control unit 114 includes a programmable device such as the microprocessor, microcontroller or programmable digital signal processor mentioned above, the processor may further include computer executable code that controls operation of the programmable device.

As can be seen in FIG. 1, the vehicle 10 further comprises an air inlet system 20 for receiving ambient air to e.g. above described fuel cell system. The air inlet system 20 comprises a first air intake conduit 30 having an air inlet 22 which draws ambient air into the first air intake conduit 30. The air inlet 22 is exemplified as being positioned on top of the vehicle cabin 40. As will be described in further detail below with reference to FIG. 4, the first air intake conduit 30 is connected to a cathode inlet via an air filter system 34.

Figure 2:
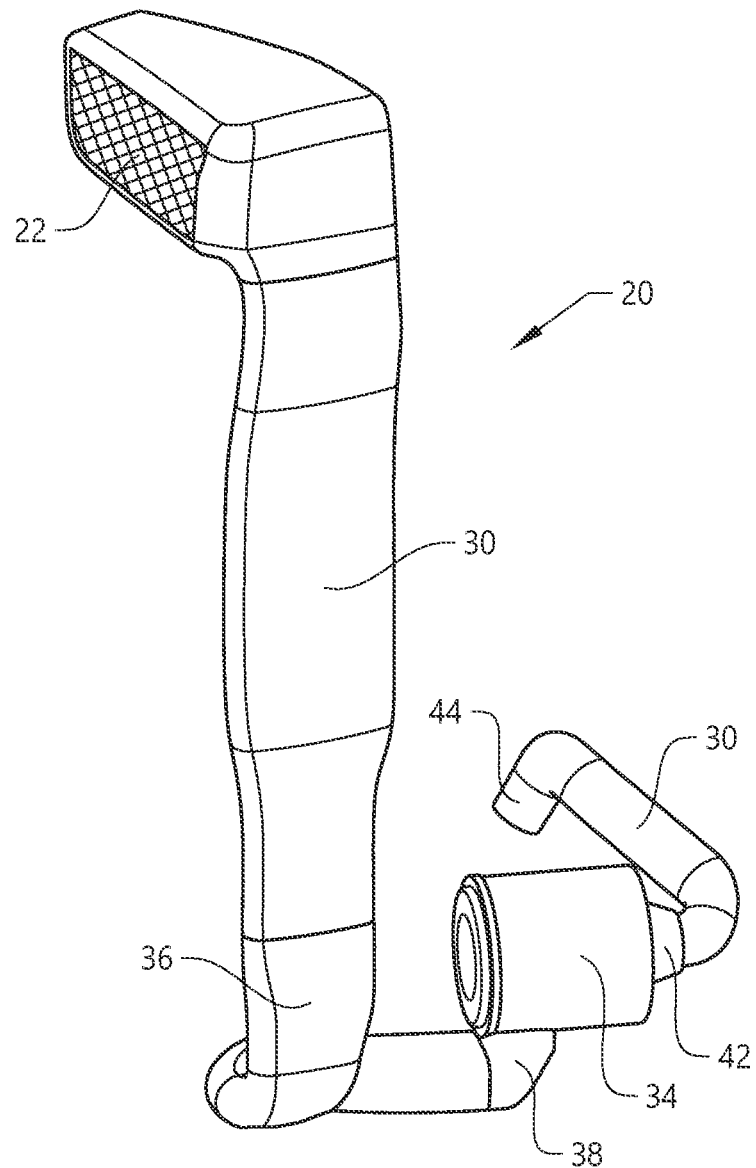
FIG. 2 is a schematic illustration of an air inlet system according to an example embodiment.

Reference is made to FIG. 2 which is a detailed schematic illustration of the air inlet system 20 according to an example embodiment. As can be seen, the air inlet system 20 comprises the above described air inlet 22, the first air intake conduit 30 and the air filter system 34. The air inlet system 20 further comprises a bellow 36 and a chamber 38 arranged between the air inlet 22 and the air filter system 34. The air inlet system 20 also comprises an air cleaner rubber bellow 42 downstream the air filter system 34, and an outlet 44 connected to the fuel cell.

Figure 3:
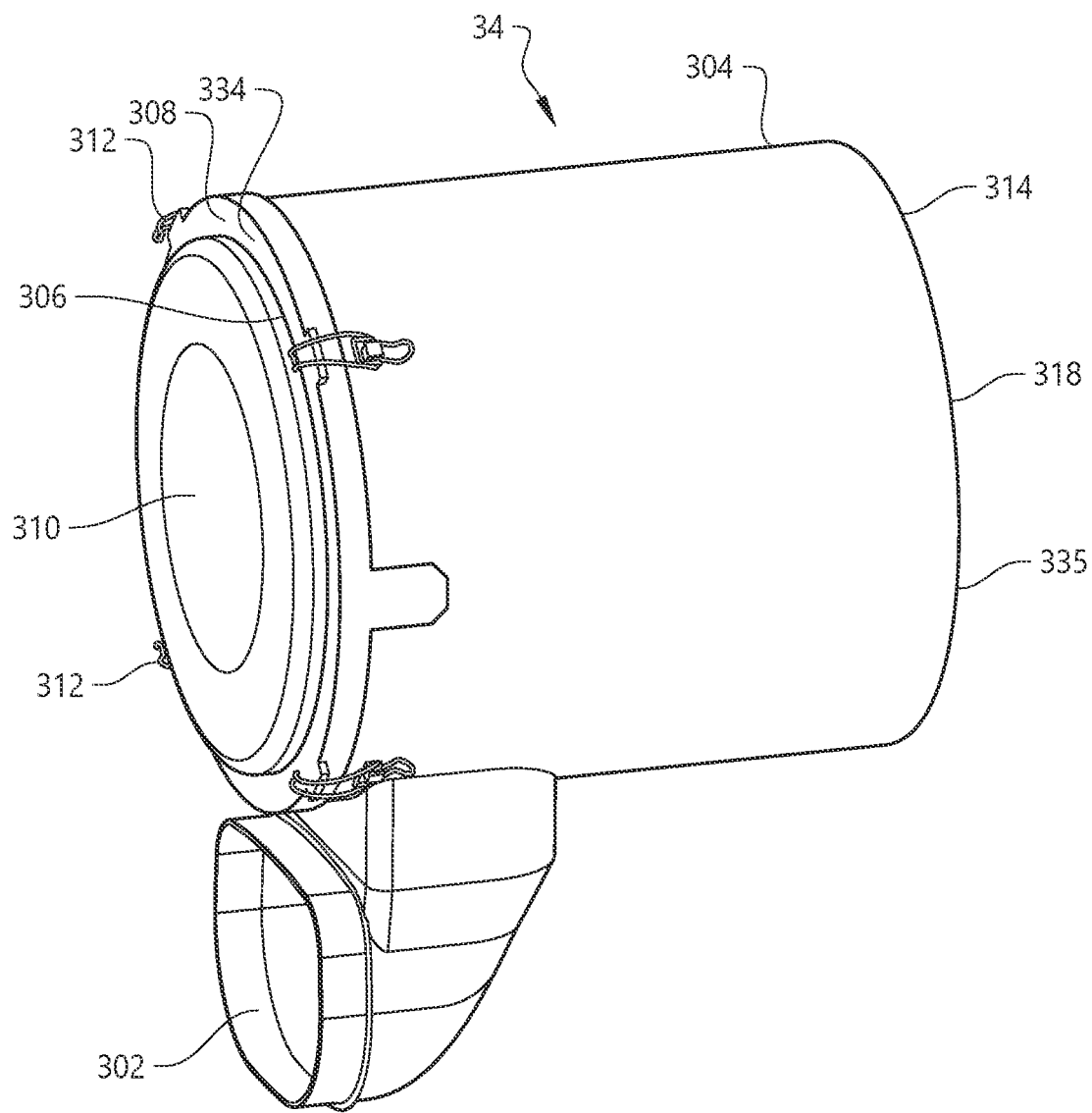
FIG. 3 is a perspective view schematically illustrating an air filter system according to an example embodiment.

Turning to FIG. 3 which is a perspective view of the air filter system 34 according to an example embodiment. The air filter system 34 comprises an inlet 302 arranged in fluid communication with the above described air inlet 22 depicted in FIG. 3. The air filter system 34 further comprises an elongated filter housing 304 having an opening 306 at an axial end 308 thereof, i.e. at a first axial housing end 334. The air filter system 34 is, at a second, opposite axial end 314 arranged in fluid communication with a fuel cell of the vehicle 10. The air filter system 34 thus comprises an outlet 318 to the fuel cell 50 at the second axial end 314, i.e. at a second axial housing end 335. The opening 306 is in FIG. 3 closed by a cover element 310. The cover element 310 is attached to the filter housing by means of a plurality of fastening elements 312. The fastening elements 312 may, for example, be arranged in the form of cover holding clips, or other suitable devices. As will be evident from e.g. FIG. 4, the air filter system 34 also comprises an air filter element (402 in FIG. 4) housed within the filter housing 304. The air filter element is thus axially insertable into the filter housing 304 by removing the cover element 310 and inserting the air filter element.

By means of the air filter system 34 in FIG. 3, ambient air is entering the inlet 302. Any potential particles present in the ambient air when entering the inlet 302 is collected by the air filter element before clean air is delivered out through the outlet 318 and directed to an air inlet (not shown) of the fuel cell 50.

Figure 4:
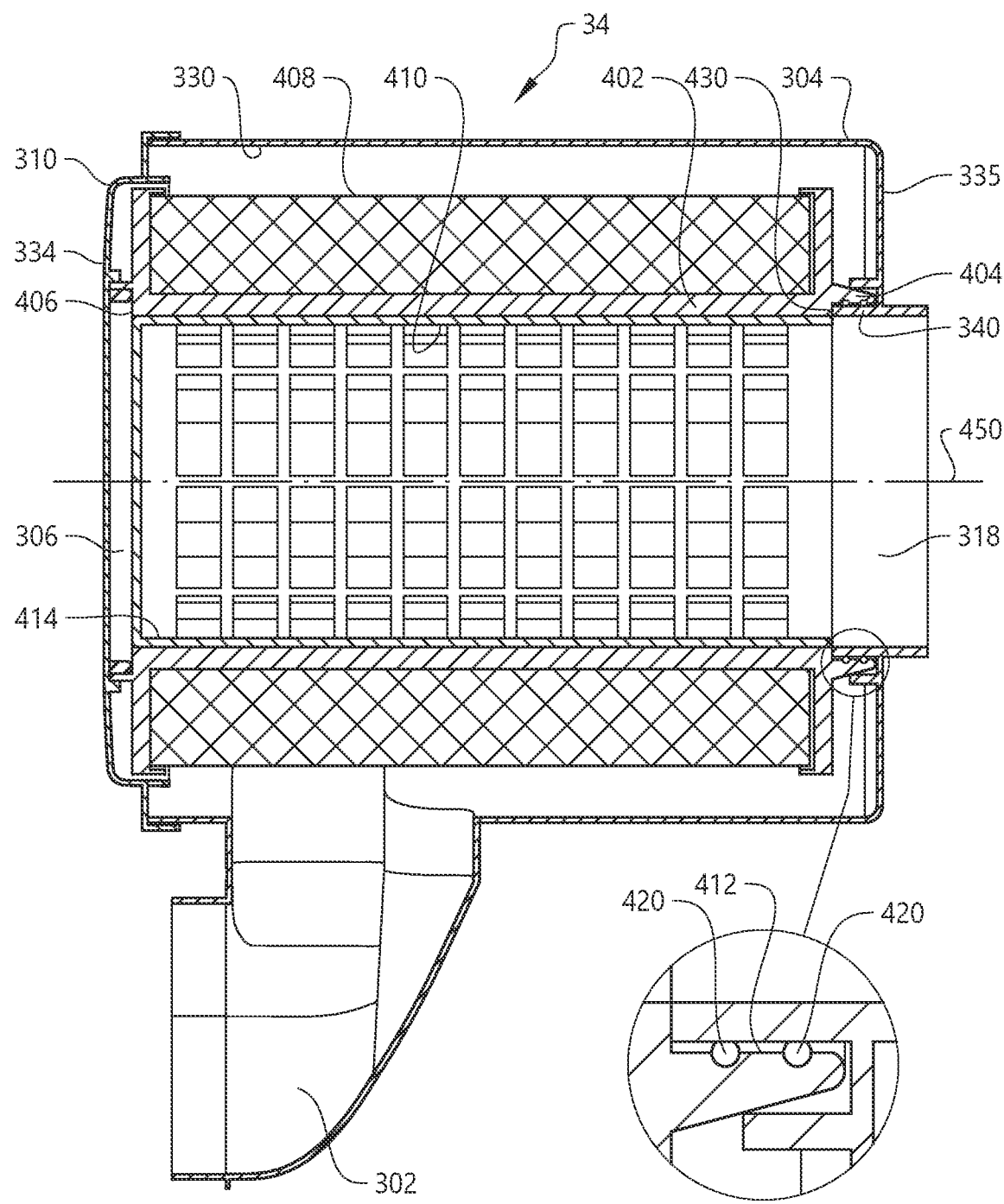
FIG. 4 is a cross-sectional view of the air filter system in FIG. 3 according to an example embodiment.

In order to describe the air filter system in further detail, reference is made to FIG. 4. FIG. 4 is a cross-sectional view of the air filter system in FIG. 3 according to an example embodiment. As can be seen in FIG. 4, the air filter element 402 is arranged as a tube shaped air filter element 402. The air filter element 402 comprises a first axial end 404 and a second axial end 406. The first axial end 404 is arranged at the outlet 318 and the second axial end 406 is arranged at the opening 306, i.e. facing the cover element 310 when the cover element 310 is attached to the filter housing 304.

As described above, the air filter element 402 is tube shaped. The air filter element 402 thus comprises an outer circumferential envelope surface 408 facing an axially extending inner surface 330 of the filter housing 304. The outer circumferential envelope surface 408 is extending between the first 404 and second 406 axial ends of the air filter element 402. The air filter element 402 also comprises a first inner circumferential envelope surface 412 at the first axial end 404, and a second inner circumferential envelope surface 414 at the second end 406. In yet further detail, the first end 404, and hence also the first inner circumferential envelope surface 412 are arranged as an axially protruding portion of the air filter element 402. The axially protruding portion of the air filter element 402 protrudes in a direction towards the outlet 318 of the filter housing.

Moreover, and as can be seen in FIG. 4, the air filter element 402 further comprises a pair of circumferentially extending ridges 420. The pair of circumferentially extending ridges 420 are arranged on the above described first inner circumferential envelope surface 412, preferably in parallel with each other as seen in the axial direction of the air filter system 34. The ridges 420 are preferably of the same size and dimensions although the size and dimension between the ridges 420 can vary slightly. Also, the pair of ridges 420 are spaced apart from each other in the axial direction of the air filter element. According to a non-limiting example, an axial distance between the pair of ridges is preferably in the range between 1-10 cm, more preferably between 2-7 cm, and most preferably between 2-4 cm. The axial distance between the pair of ridges is thus a non-zero distance. It should be understood that the specific distance is dependent on the size of the air filter element. Hence, a larger air filter element preferably presents a larger axial distance between the pair of ridges.

Moreover, each of the pair of circumferentially extending ridges 420 protrudes towards a geometric centre axis 450 of the air filter element 402 and preferably also extends around the entire first inner circumferential envelope surface 412. The geometric centre axis 450 is also a geometric centre axis for the air filter system 34. The pair of circumferentially extending ridges 420 is thus formed by a first and a second circumferentially extending ridge, but the air filter element 402 may also comprise more than two circumferentially extending ridges on the first inner circumferential envelope surface 412. The pair of circumferentially extending ridges 420 engage with an axially protruding portion 340 of the filter housing 304. The axially protruding portion 340 of the filter housing 304 protrudes from the outlet 318, i.e. from the second axial housing end 335, in an axial direction towards the opening 306 of the filter housing 304, i.e. towards the first axial housing end 334. The axially protruding portion may be a flat, straight portion. The axially protruding portion may however also be provided with a draft, i.e. slightly taper-shaped, for simplifying manufacturing. The pair of ridges will hereby provide for an interface sealing between the filter housing 304 and the air filter element 402 as well as advantageously align the air filter element 402 to the filter housing when inserting the air filter element 402 into the filter housing 304.

Preferably, the pair of ridges 420 and the first inner circumferential envelope surface 412 are integrally formed with each other and produced by the same material. However, and as an alternative, the pair of ridges 420 may be formed as a separate component attached to the first inner circumferential envelope surface 412. In the latter case, the pair of ridges 420 and the first inner circumferential envelope surface 412 may be formed by different material. When the pair of ridges 420 is arranged as a separate component, a pair of circumferentially arranged grooves may be formed on the first inner circumferential envelope surface 412 for simplifying the attachment of the pair of ridges 420 to the first inner circumferential envelope surface 412 and also to improve the sealing characteristics at the interface between the air filter element 402 and the filter housing 304.

Although not illustrated in detail, the air filter system 34 may further comprise an axial sealing element 430 arranged axially between the air filter element 402 and the axially protruding portion 340 of the filter housing 304. With the use of the above described pair of ridges, the axial sealing element 430 may be reduced in sized compared to a conventional filter system.

Figure 5:
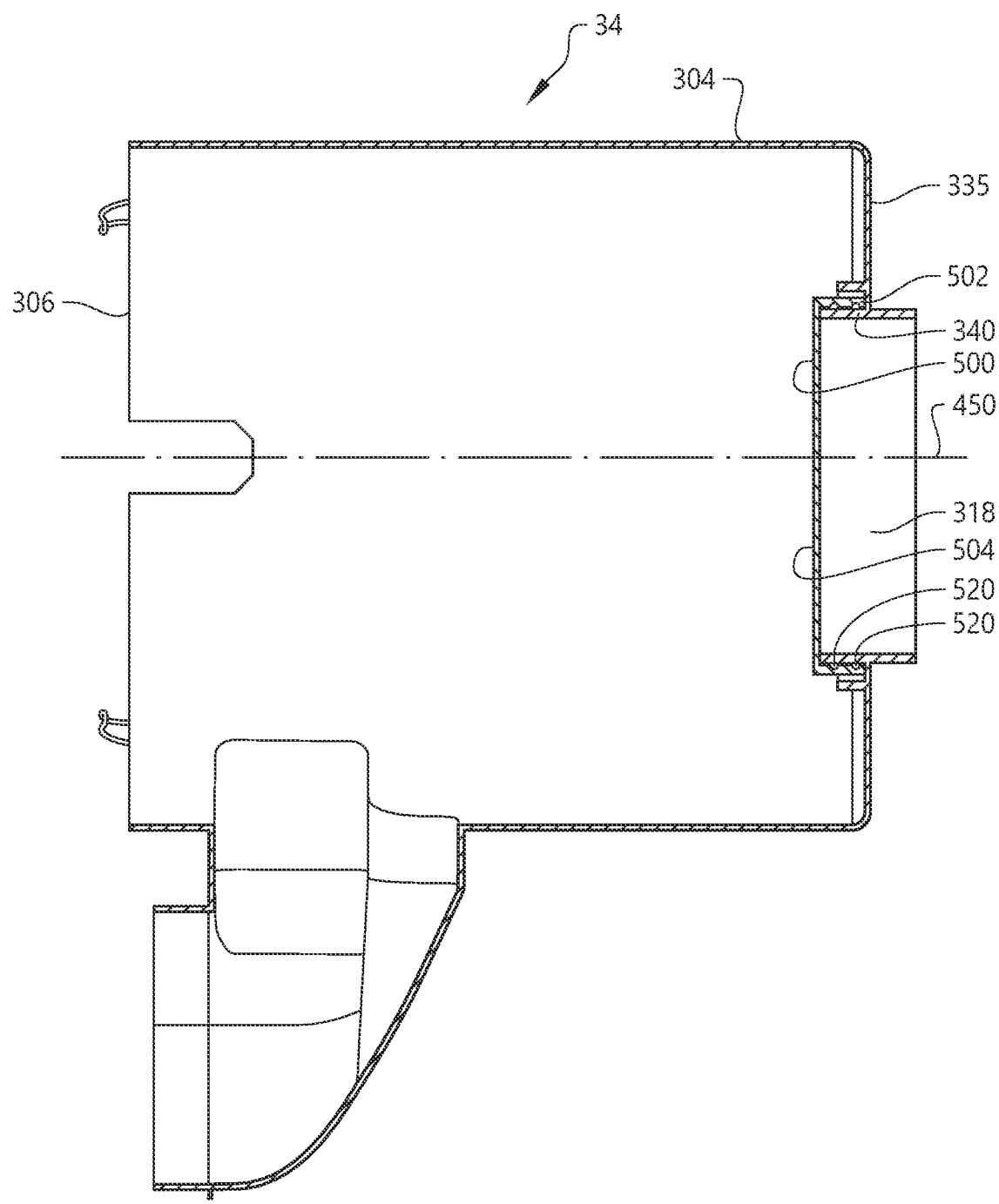
FIG. 5 is a cross-sectional view of a filter housing and a lid according to an example embodiment.

Reference is now made to FIG. 5. As can be seen in FIG. 5, the air filter element 402 has been removed by removing the cover element 310 and pulling the air filter element 402 axially out from the opening 306 of the filter housing 304. Instead, the air filter system 34 now comprises a lid 500. The lid 500 comprises a circumferentially extending surface portion 502 and a cover surface 504. The cover surface 504 has a surface normal facing the opening 306 and is arranged to cover the outlet 318 towards the fuel cell 50.

As depicted in FIG. 5, the lid 500 is connected to the second axial housing end 335 when the air filter element 402 is removed from the filter housing 304. In further detail, the lid 500 is attached to the axially protruding portion 340 of the filter housing 304 such that the circumferentially extending surface portion 502 enclose the axially protruding portion 340. As can also be seen in FIG. 5, the lid 500 comprises a pair of circumferentially extending bulges 520. The bulges 520 protrudes radially from the circumferentially extending surface portion 502 towards the geometric centre axis 450 of the air filter system 34. By attaching the lid 500 to the axially protruding portion 340 of the filter housing 304, the outlet 318 to the fuel cell is closed when the air filter element 402 is removed, thereby reducing the risk of particles entering the air inlet of the fuel cell during maintenance and air filter replacement.

Figure 6:
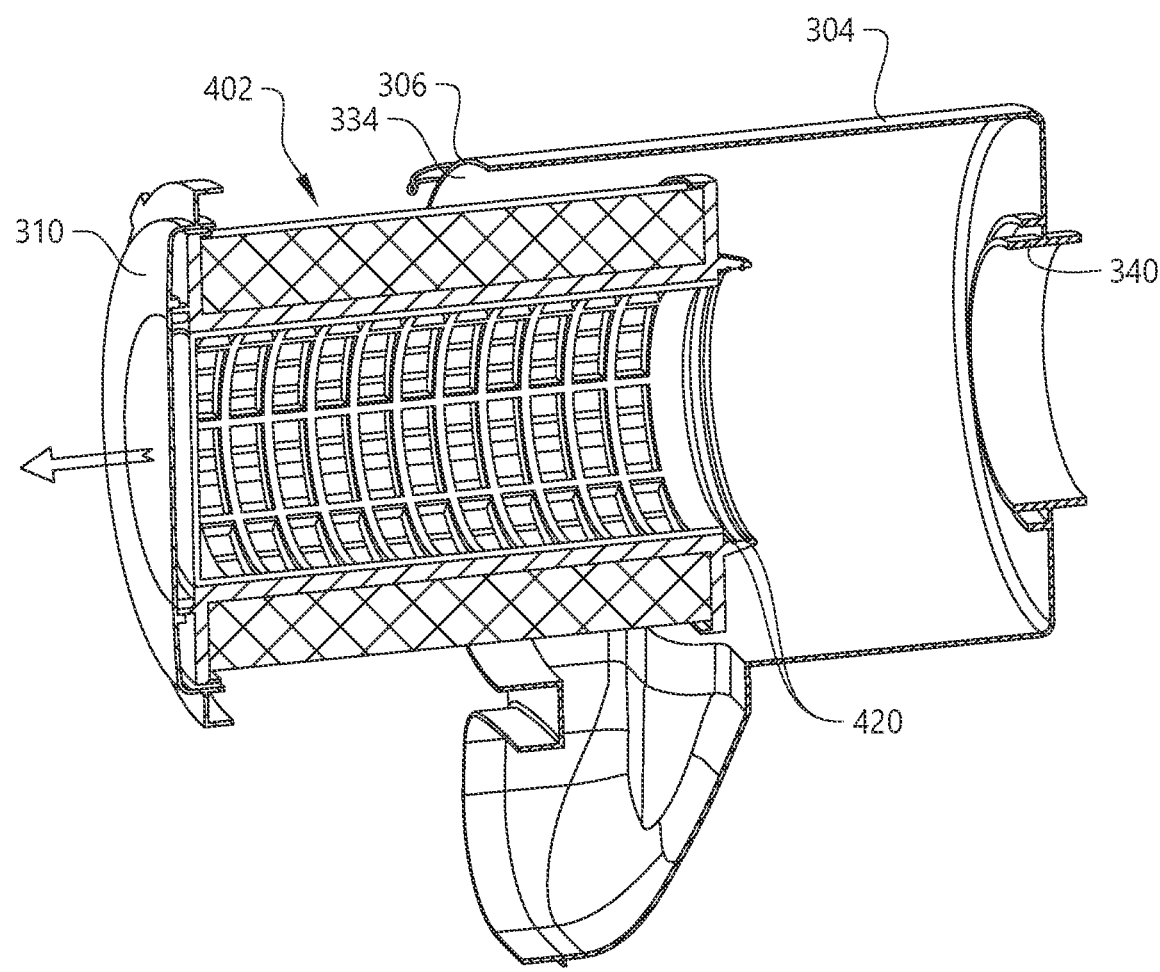
FIG. 6 is a cross-sectional perspective view of sequence when removing the air filter element from the filter housing according to an example embodiment.
Figure 7:
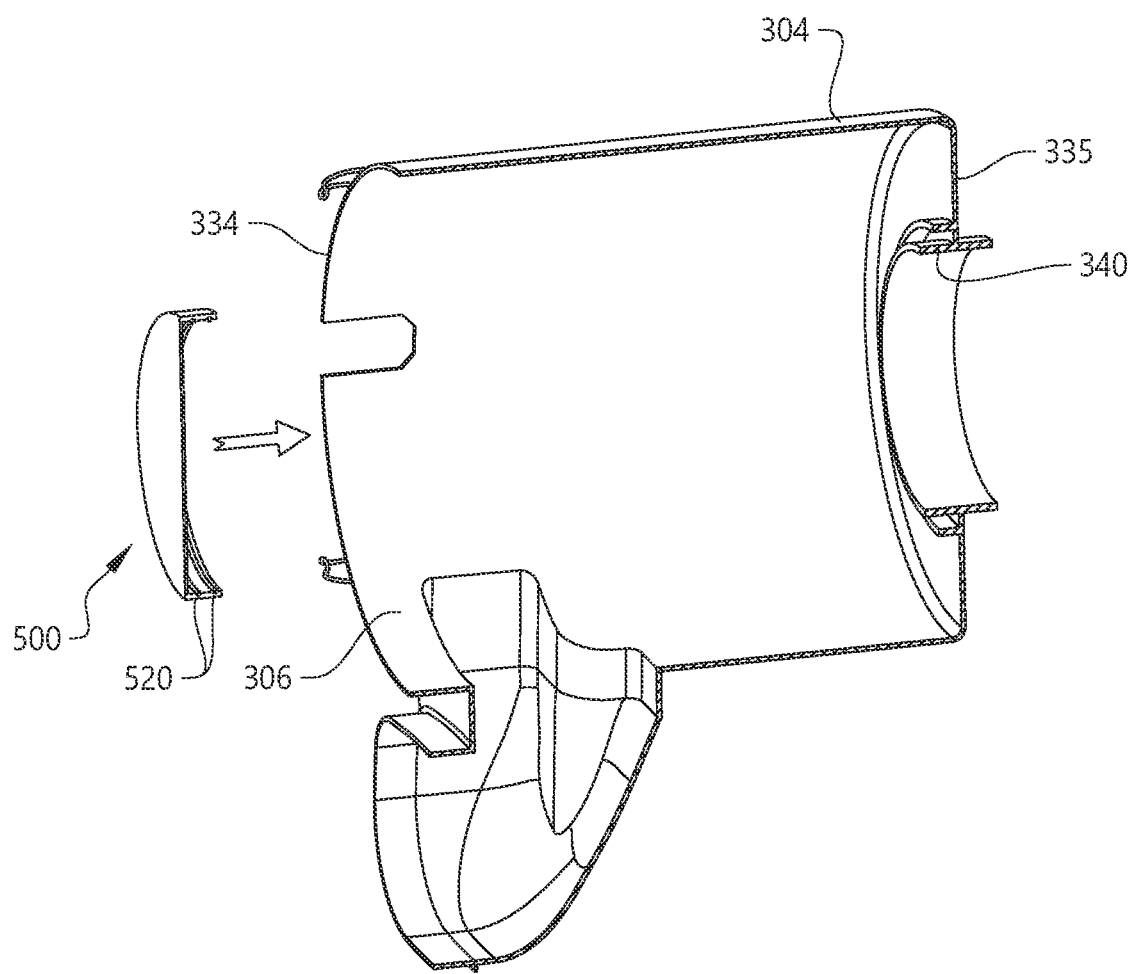
FIG. 7 is a cross-sectional perspective view of sequence when inserting the lid into the filter housing according to an example embodiment and FIG. 8 is a flow chart of a method of cleaning an air filter system according to an example embodiment.
Figure 8:
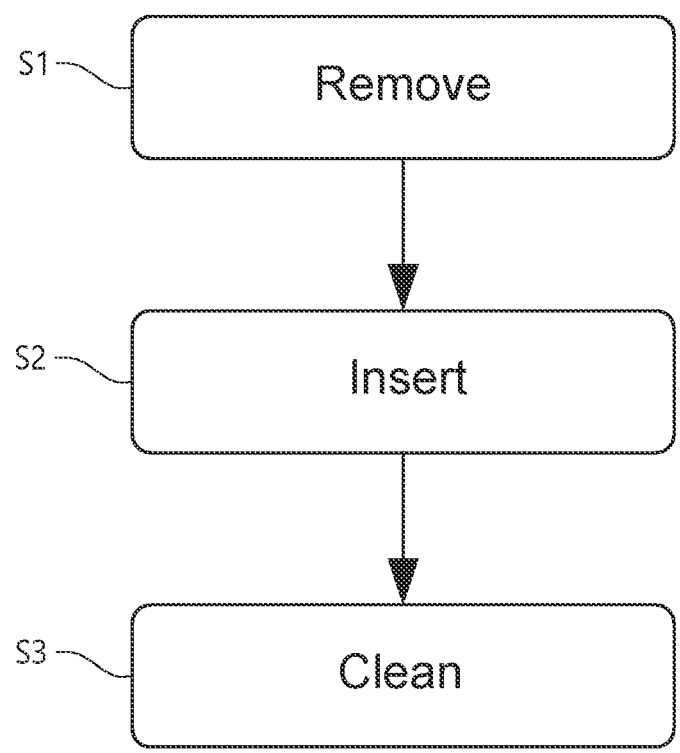

Reference is now made to FIGS. 6-8 for describing a method of cleaning the above described air filter system 34. In a first step, the air filter element 402 is removed S1 from the filter housing 304. The removal of the air filter element 402 is performed by displacing the air filter element 402 axially through the second axial housing end 334, i.e. through the opening 306 of the filter housing 304, which is illustrated in detail in FIG. 6. According to the exemplified embodiment of FIG. 6, when removing the cover element 310, the air filter element 402 is also removed. Thus, the cover element 310 may be attached to, or integrated with, the air filter element 402. When removing the air filter element 402, any dust particles potentially present on the axially protruding portion 340 will be forced into the bottom of the filter housing 304. In detail, the pair of ridges 420 will swipe the surface of the axially protruding portion 340 free from particles and dust.

Thereafter, and with particular reference to FIG. 7, the lid 500 is inserted S2 into the filter housing 304. In particular, the lid 500 is inserted through the opening 306 of the filter housing 304 at the second axial housing end 334. The lid 500 is attached to the axially protruding portion 340 of the filter housing 304, i.e. attached at to the outlet at the second axial housing end 335. Any dust particles potentially present on the axially protruding portion 340 will, by means of the pair of circumferentially extending bulges 520, be forced towards the first axial housing end 335 of the filter housing 304.

When the lid 500 is attached to the outlet at the second axial housing end 335, the filter housing 304 is cleaned from dust and particles by, for example, blowing air into the filter housing 304 through the opening 306. Hereby, the air will blow any dust or particles in the filter housing 304 out through the outlet 306. When the interior of the filter housing is clean, a new air filter element 204 can be inserted into the filter housing 304 through the opening 306, and attached to the axially protruding portion 340 of the filter housing as described above.

It is to be understood that the present disclosure is not limited to the embodiments described above and illustrated in the drawings; rather, the skilled person will recognize that many changes and modifications may be made within the scope of the appended claims.

The invention claimed is:

1. An air filter system for a fuel cell vehicle, the air filter system comprising:
   an elongated filter housing comprising an opening at a first axial housing end, and an outlet connectable to a fuel cell at a second axial housing end,
   a tube shaped air filter element, the air filter element being housed inside the filter housing and axially insertable into the opening at the first axial housing end of the elongated filter housing, wherein the air filter element comprises:
   a first axial end and a second axial end, the first axial end being arranged on an opposite axial end of the air filter element compared to the second axial end, wherein the second axial end is arranged to, when the air filter element is inserted into the filter housing, face the opening of the elongated filter housing,
   an outer circumferential envelope surface configured to face an axially extending inner surface of the filter housing, the outer circumferential envelope surface extending between the first and second axial ends,
   a first inner circumferential envelope surface arranged at the first axial end of the air filter element, and a second inner circumferential envelope surface arranged at the second end of the air filter element, and
   a pair of circumferentially extending ridges on the first inner circumferential envelope surface, each of the pair of ridges protrudes towards a geometric centre axis of the air filter element and is configured to engage with an axially protruding portion of the filter housing,
   wherein the air filter system further comprises a lid connectable to the second axial housing end upon removal of the air filter element from the filter housing.

2. The air filter system according to claim 1, wherein the pair of ridges are axially parallel with each other.

3. The air filter system according to claim 1, wherein each of the pair of ridges extends circumferentially around the entire first inner circumferential envelope surface.

4. The air filter system according to claim 1, wherein the pair of ridges and the first inner circumferential envelope surface are formed by the same material.

5. The air filter system according to claim 4, wherein the pair of ridges are integrally formed with the first inner circumferential envelope surface.

6. The air filter system according to claim 1, wherein the pair of ridges are separately attached to the first inner circumferential envelope surface.

7. The air filter system according to claim 6, wherein each of the pair of ridges is attached in a respective circumferentially arranged groove formed in the first inner circumferential envelope surface.

8. The air filter system according to claim 1, wherein the axially protruding portion is arranged at the second axial housing end, the axially protruding portion protrudes axially towards the first axial housing end.

9. The air filter system according to claim 8, wherein the pair of circumferentially extending ridges of the air filter element engage with the axially protruding portion of the filter housing.

10. The air filter system according to claim 1, wherein the lid is attachable to the axially protruding portion of the filter housing.

11. The air filter system according to claim 10, wherein the lid comprises a pair of circumferentially extending bulges protruding towards a geometric centre axis of the air filter system and is configured to engage with the axially protruding portion of the filter housing.

\* \* \* \* \*